United States Patent
Nanivadekar et al.

(10) Patent No.: US 12,430,430 B2
(45) Date of Patent: Sep. 30, 2025

(54) SELECTIVE MALWARE SCANNING OF FILES ON VIRTUALIZED SNAPSHOTS

(71) Applicant: VMware LLC, Palo Alto, CA (US)

(72) Inventors: Mandar Nanivadekar, Pune (IN); Leena Shuklendu Soman, Pune (IN); Boris Weissman, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 179 days.

(21) Appl. No.: 18/379,699

(22) Filed: Oct. 13, 2023

(65) Prior Publication Data
US 2025/0036762 A1  Jan. 30, 2025

(30) Foreign Application Priority Data
Jul. 25, 2023  (IN) .............................. 202341050099

(51) Int. Cl.
*G06F 21/56* (2013.01)

(52) U.S. Cl.
CPC .......... *G06F 21/565* (2013.01); *G06F 21/564* (2013.01)

(58) Field of Classification Search
CPC ..... G06F 21/565; G06F 21/564; G06F 21/568
See application file for complete search history.

(56) References Cited

U.S. PATENT DOCUMENTS

| 9,977,894 B2 * | 5/2018 | Gilbert ................... G06F 21/564 |
| 2020/0319979 A1 * | 10/2020 | Kulaga ................ G06F 11/3006 |
| 2024/0086284 A1 * | 3/2024 | Warwick ............... H04L 63/145 |

* cited by examiner

*Primary Examiner* — Brian F Shaw
(74) *Attorney, Agent, or Firm* — King Intellectual Asset Management

(57) ABSTRACT

A VCI snapshot associated with a version of a malware infected VCI is scanned for malware. The malware scanning includes selecting a first file of the VCI snapshot and determining that a file, in a previously scanned VCI snapshot associated with another version of the malware infected VCI, which corresponds to the selected first file has a clean reputation indicator. Further, it is determined that the metadata of the selected first file matches metadata of the corresponding file. Based on these determinations, the malware scanning proceeds to scan the next file for malware without scanning the selected first file for malware.

20 Claims, 6 Drawing Sheets

SELECTIVE MALWARE SCANNING OF FILES ON VIRTUALIZED SNAPSHOTS

RELATED APPLICATIONS

Benefit is claimed under 35 U.S.C. 119 (a)-(d) to Foreign application Serial No. 202341050099 filed in India entitled "SELECTIVE MALWARE SCANNING OF FILES ON VIRTUALIZED SNAPSHOTS", on Jul. 25, 2023, by VMware, Inc., which is herein incorporated in its entirety by reference for all purposes.

BACKGROUND

In a distributed storage system, when malware is detected in a virtual computing instance (VCI) or on a computing device, recovery processes are initiated to recover data from the infected device and/or restore the state of the distributed storage system while avoiding as much downtime as possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for scanning a VCI snapshot for malware is described. A VCI snapshot associated with a version of a malware infected VCI is obtained and the obtained VCI is scanned for malware. The malware scanning includes selecting a first file of the obtained VCI snapshot and determining that a corresponding file to the selected first file in a previously scanned VCI snapshot associated with another version of the malware infected VCI has a clean reputation indicator in a previous file system data structure of the previously scanned VCI snapshot. Further, it is determined that the metadata of the selected first file matches metadata of the corresponding file in the previous file system data structure of the previously scanned VCI snapshot. Then, scanning of the selected first file for malware using a malware detection agent is not performed based on the described determinations.

Further, another computerized method for scanning a VCI snapshot for malware is described. A VCI is created using a VCI snapshot of a version of a malware infected VCI. A current file system data structure of the created VCI is generated, wherein the generated current file system data structure includes data associated with a group of files in the VCI snapshot of the version of the malware infected VCI. A subgroup of clean files is identified in the group of files using a previous file system data structure associated with a previously scanned VCI snapshot of another version of the malware infected VCI, wherein files in the subgroup of clean files have data in the current file system data structure that matches corresponding data in the previous file system data structure and have clean reputation indicators in the previous file system data structure. A subgroup of files to be scanned is determined in the group of files, wherein the subgroup of files to be scanned omits the identified subgroup of clean files. The determined subgroup of files to be scanned is scanned for malware using a malware detection agent and the version of the malware infected VCI is determined to be clean of malware using the scanning. A clean version of the malware infected VCI is deployed using the version of the malware infected VCI.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale. Any of the drawings may be combined into a single example or embodiment.

DETAILED DESCRIPTION

Figure 1:
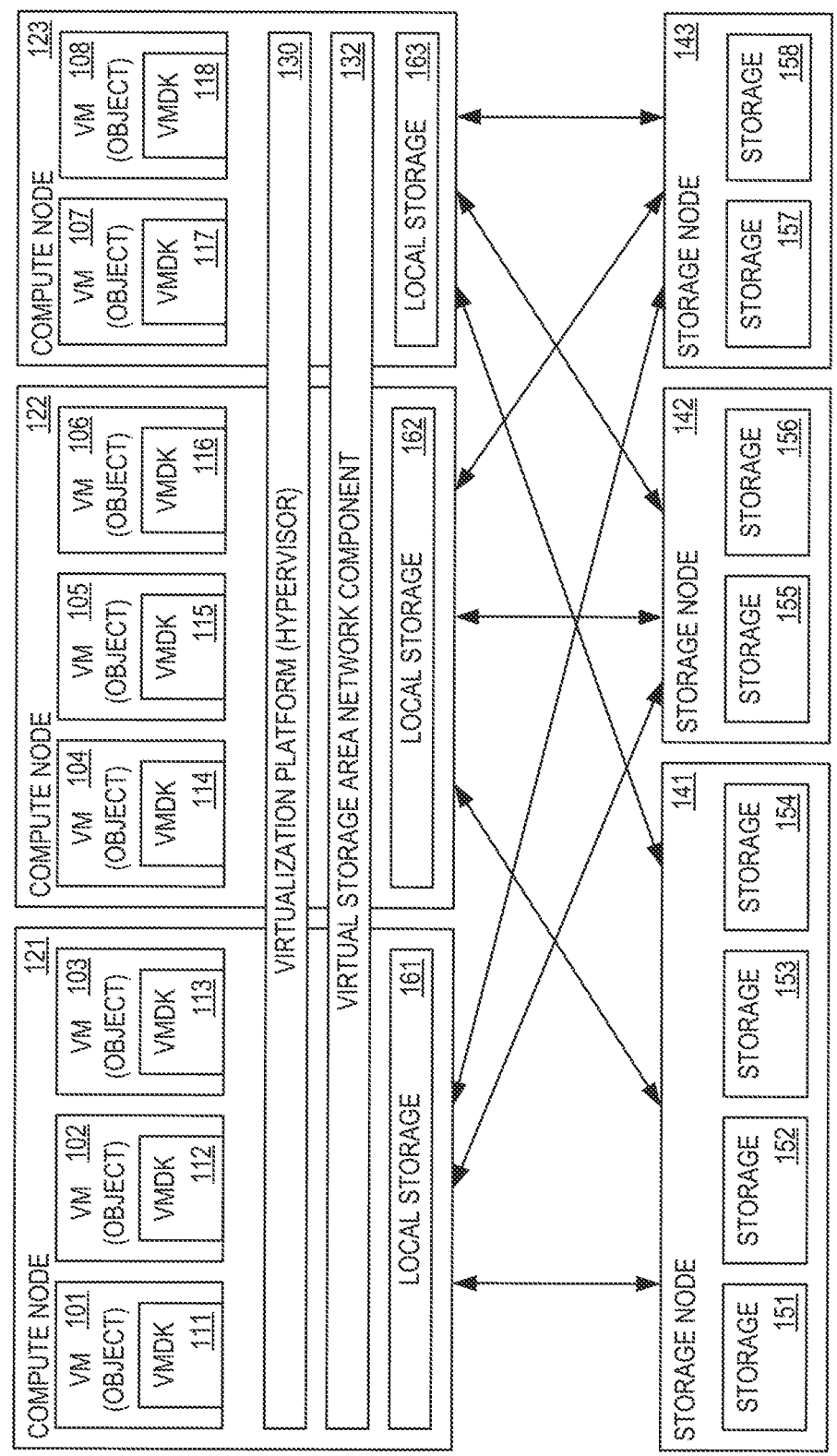
FIG. 1 is a block diagram illustrating an example system that is comprised of a set of compute nodes interconnected with each other and a set of storage nodes.

Aspects of the disclosure provide a computerized method and system for selectively scanning files in snapshots of a virtualized computing instance (VCI) for malware. VCI snapshots of a potentially-malware infected VCI are scanned starting with the most recent VCI snapshot and moving sequentially back through the available VCI snapshots until a clean VCI snapshot is found. Scanning all the files is a resource- and time-intensive process, especially when there are large quantities of files to be scanned. Instead, the disclosure is configured to enable a malware scanning process that avoids or refrains from scanning some of the files of a VCI snapshot. For a current file in a VCI snapshot that is to be scanned, it is determined whether a corresponding file in a previously scanned snapshot was found to be free of malware. If so, it is determined whether metadata of the current file and corresponding file match. If both determinations are positive, the current file is concluded to be free of malware, and the system refrains from scanning the current file for malware, which avoids performing the relatively resource-expensive malware detection processes on the current file. This process is repeated for each of the files in the VCI snapshot. In some examples, many files remain unchanged between consecutive VCI snapshots, such that significant quantities of the files can be found to be clean of malware without actually scanning those files for malware. In this way, computing resources are managed better, including the use of memory, processing, and bandwidth.

The disclosure operates in an unconventional manner at least by generating file system data structures, such as the file system trees described herein, to store metadata associated with files of VCI snapshots. The recording of file metadata, such as file attributes, file system entity structural relationships, and/or disk cluster mapping data, is relatively inexpensive with respect to time and computing system resources compared to the costs associated with performing malware detection on files. The generated file system data structures enable the VCI snapshot scanning processes described herein to quickly and efficiently determine whether a file is clean of malware or needs to be scanned for malware. By enabling the malware scanning process to omit a significant quantity of files from file-specific malware scanning operations, the rate at which the malware scanning process on the VCI snapshot can be completed is increased and the computing costs of processing and network resources are reduced.

Further, the disclosure describes the comparison of metadata of multiple versions of files using two steps. For a file to be determined to be free of malware without scanning the file using the malware detection agent, the metadata associated with a current version of the file must match the metadata associated with a previous version of the file. The file attributes of both file versions are compared and, if the file attributes are found to match, then the disk cluster mappings of the two files are compared. If the file attributes are found to not match, then the disk cluster mapping comparison need not be performed, and the file will be scanned for malware as described herein. Thus, the evaluation of each file that may be determined to be free of malware as described herein is streamlined and instances of unnecessary disk cluster mapping comparison are avoided. This further improves the rate at which the overall scanning process can be performed and improves the efficiency of processing resource usage during that process.

FIG. 1 is a block diagram illustrating a system 100 that is comprised of a set of compute nodes 121-123 interconnected with each other and a set of storage nodes 141-143 according to an embodiment. In other examples, a different number of compute nodes and storage nodes are used without departing from the description. Each compute node hosts multiple objects, which are virtual machines (VMs), containers, applications, and/or any compute entity that can consume storage, in some examples. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node hosts 50, 100, or a different number of objects. Each object uses a virtual machine disk (VMDK). For example, VMDKs 111-118 are used by objects 101-108, respectively. Other implementations using different formats are also possible. A virtualization platform 130, which includes hypervisor functionality at one or more of computer nodes 121, 122, and 123, manages objects 101-108.

Figure 6:
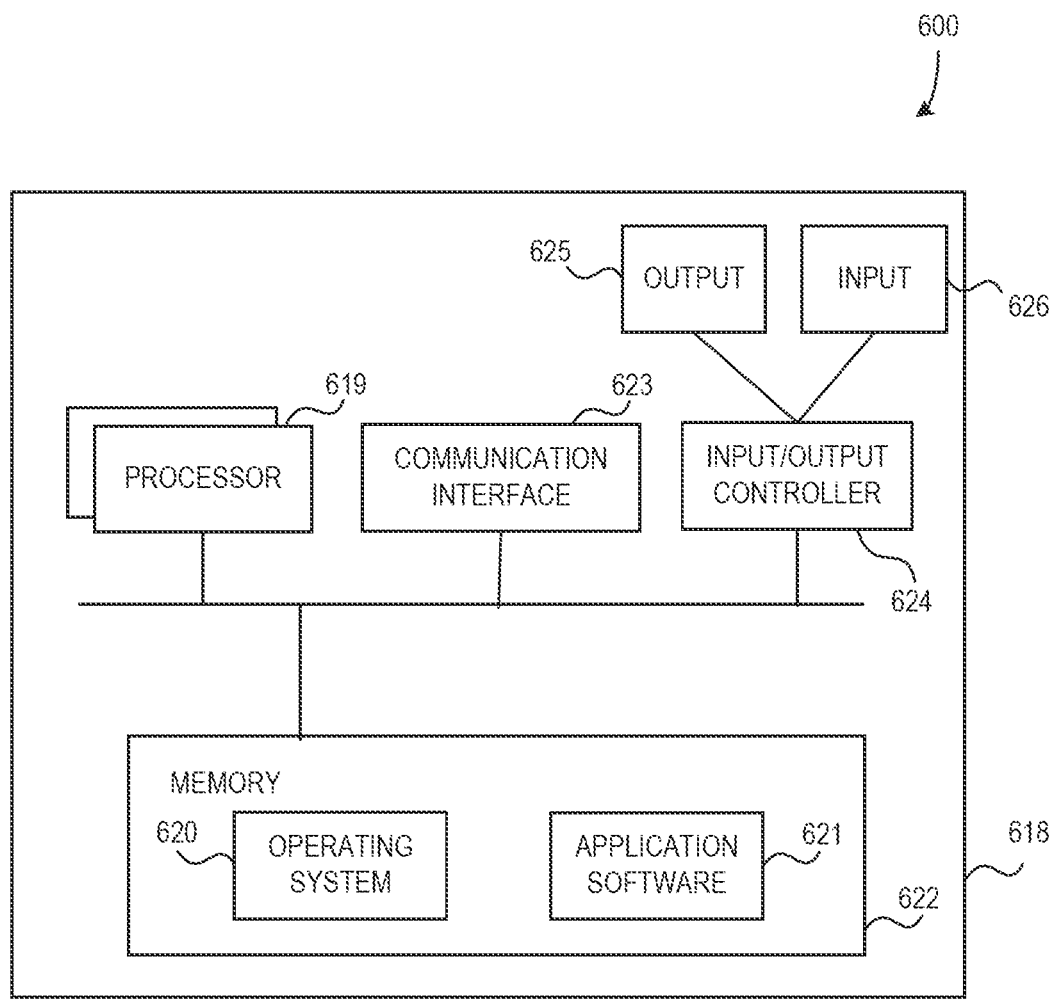
FIG. 6 illustrates an example computing apparatus as a functional block diagram.

In some examples, various components of system 100, for example compute nodes 121, 122, and 123, and storage nodes 141, 142, and 143 are implemented using one or more computing apparatuses 618 of FIG. 6.

Virtualization software provides software-defined storage (SDS) by pooling storage nodes across a cluster, creates a distributed, shared data store (e.g., a storage area network (SAN)). In some examples with distributed arrangements, servers are distinguished as compute nodes (e.g., compute nodes 121, 122, and 123) and storage nodes (e.g., storage nodes 141, 142, and 143). In such examples, storage nodes attach large quantities of storage devices (e.g., flash, solid state drives (SSDs) and non-volatile memory express (NVMe) and Persistent Memory (PMEM)) processing power are limited beyond the ability to handle input/output (I/O) traffic. For example, storage node 141 has storage 151, 152, 153, and 154; storage node 142 has storage 155 and 156; and storage node 143 has storage 157 and 158. In other examples, a single storage node includes a different number of physical storage components without departing from the description. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

In some examples, thin provisioning is used and storage nodes 141-143 do not require significantly more processing power than is needed for handling I/O traffic. This arrangement is less expensive than many alternative hyperconverged environments in which all of storage nodes 141-143 have the same or similar processing capability as compute node 121. Using the disclosure, compute nodes 121-123 can operate with a wide range of storage options.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. For example, virtual SAN component 132 permits objects 101 and 102 to write incoming data from object 101 and incoming data from object 102 to storage nodes 141, 142, and/or 143, in part, by virtualizing the physical storage components of the storage nodes. Further, in some examples, the compute nodes 121, 122, and 123 include and make use of local storage nodes 161, 162, and 163, respectively, for storing some data used during the operation of the system 100 without departing from the description.

Figure 2:
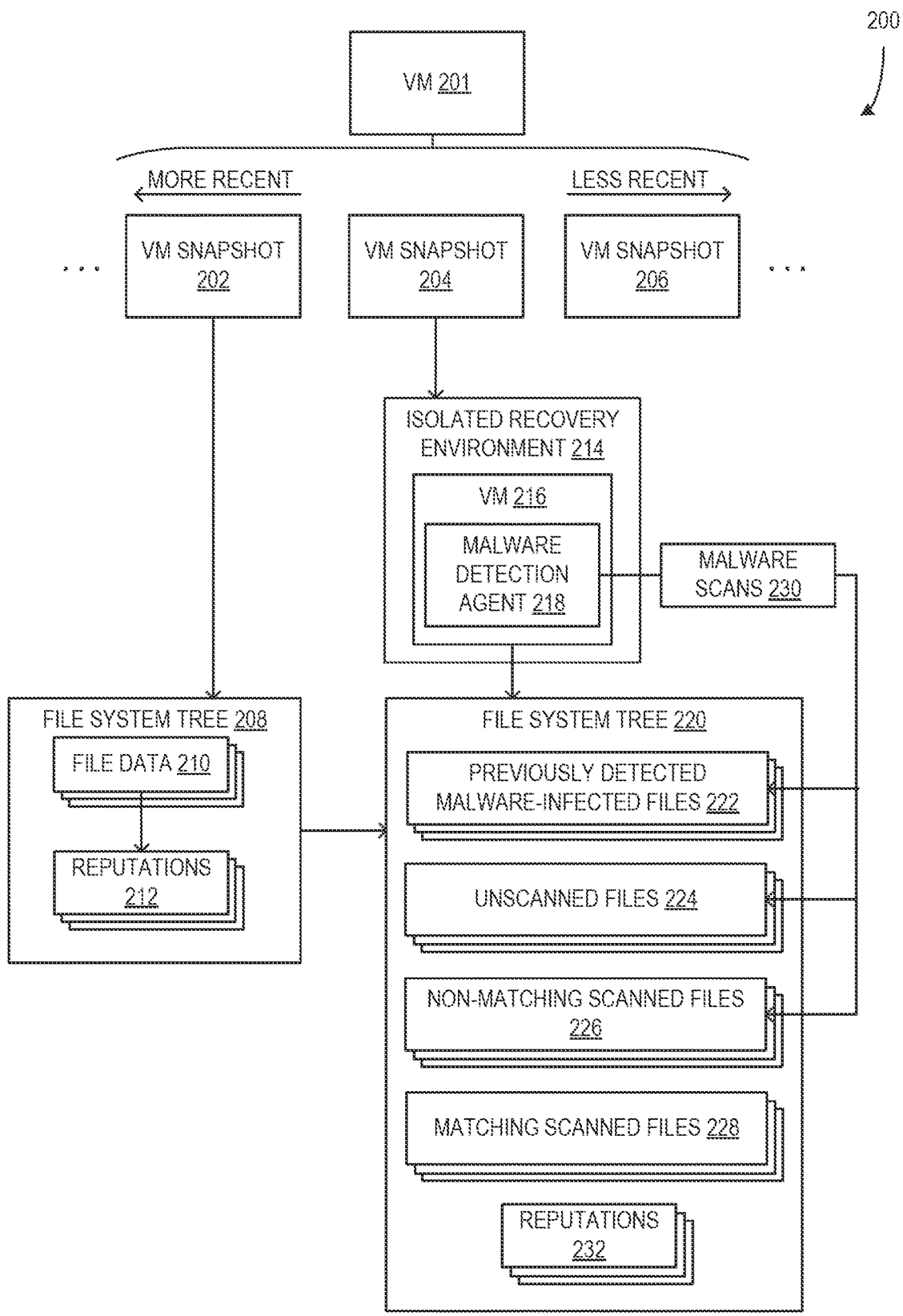
FIG. 2 is a block diagram illustrating an example system for scanning virtual machine (VM) snapshots of a VM for the presence of malware.

FIG. 2 is a block diagram illustrating an example system 200 for scanning VM snapshots 202-206 of a VM 201 for the presence of malware. In some examples, the system 200 is part of or associated with a system such as system 100 of FIG. 1. For example, the VM 201 is a VM that is part of a compute node, such as VM 101 on compute node 121.

The system 200 is configured to scan multiple VM snapshots 202, 204, and/or 206 of the VM 201 to determine the most recent version of the VM 201 that is not infected with malware (also referred to as being 'free' or 'clean'). In some examples, the system scans the VM snapshots associated with versions of the VM 201 from the most recent version toward the oldest version. For instance, as illustrated, the VM snapshot 202 is the most recent illustrated version of the VM 201, the VM snapshot 204 is the next most recent illustrated version of the VM 201, and the VM snapshot 206 is the least recent illustrated version of the VM 201. In such an example, the VM snapshot 202 is scanned for malware first and, when malware is identified on the VM snapshot 202, the next most recent VM snapshot 204 is scanned for malware. This process is continued until a clean VM snapshot of the VM 201 is identified. Then, the identified clean VM snapshot can be used for data recovery from the VM 201 and/or to continue operation of the VM 201.

In some examples, scanning a VM snapshot 204 for malware includes creating an instance VM 216 of the VM snapshot 204 in an isolated recovery environment 214. The VM 216 is created and executed in the isolated recovery environment 214 using all features and attributes of the VM snapshot 204, such that the VM 216 is substantially a copy of the version of the VM 201 associated with the VM snapshot 204. Further, a malware detection agent 218 is installed on the VM 216 that is configured to perform malware scans 230 on files and/or other entities of the VM 216 as described herein.

Further, the described process to scan the VM snapshot 204 for malware includes generating a file system tree 220 that is representative of the contents and structure of the VM 216. In some examples, the file system tree 220 is generated to include data representing the relationships between file system entities (e.g., directories, files, soft links, hard links, junctions, or the like). Additionally, or alternatively, the file system tree 220 includes attributes of file system entities, such as file size, timestamps, file archive flags, or the like. Still further, in some examples, the file system tree 220 includes file identifiers and data associated with the disk cluster mapping of files and/or other important file metadata. The file system tree 220 is then stored in data storage that is external from the VM 201 and/or VM snapshots 202-206.

In some examples, after the file system tree 220 is created, the malware detection agent 218 performs malware scans 230 on some or all of the files and/or other file system entities that are represented in the file system tree 220 and/or present in the VM 216. In an example where the VM snapshot being scanned is the most recent VM snapshot of the VM 201, all of the files on the VM 216 are scanned for the presence of malware, such as ransomware or other types of threats. As a result of the malware scanning of the files, reputation data is generated that indicates whether each file is infected with malware in some way or free of malware. As illustrated, the file system tree 208 associated with the VM snapshot 202 includes file data 210 associated with the files and/or other entities of the VM snapshot 202 and reputations 212, which are indicators that indicate the malware statuses of those files and/or other entities (e.g., infected with malware or "clean" of malware). In some such examples, reputations 212 include other information, such as what type of malware has infected a particular file and/or other metadata associated with the malware infection.

In other examples, when the VM snapshot 204 being scanned is not the first or most recent VM snapshot of the VM 201 to be scanned, file system trees 208 from prior scanned VM snapshots 202 are used to improve the efficiency of the scanning process of the current VM snapshot 204. Scanning individual files of the VM 216 by the malware detection agent 218 is a time-consuming process and the use of data from scans of previous VM snapshots 202 enables the quantity of files to be scanned to be reduced significantly. The system 200 is configured to divide the files and/or other file system entities of the VM 216 into several subgroups and then to enable the malware detection agent 218 to omit a subgroup of files from being scanned for malware.

Further, it should be understood that, in most examples described herein, the VM snapshots 202-206 of a VM 201 are scanned for malware in reverse chronological order, or starting with the most recent snapshot (e.g., VM snapshot 202) and proceeding toward progressively less recent snapshots (e.g., to VM snapshot 204 and then to VM snapshot 206 as necessary). Thus, while VM snapshot 202 and the associated file system tree 208 are associated with a more recent version of the VM 201 with respect to the normal operations of the VM 201, the scanning of the VM snapshot 202 and/or generation of the file system tree 208 occurs before the scanning of the VM snapshot 204 and/or generation of the file system tree 220 during the overall scanning process of the VM 201 as described herein. So, file system tree 208 is sometimes referred to as a previously generated file system tree 208 and/or previous file system tree 208, referring to the fact that the file system tree 208 was generated prior to the generation of file system tree 220.

Files 222 of the VM 216 that have been previously detected as being malware infected are identified using the reputations 212 of the previously generated file system tree 208 (the file system tree 208 associated with a more recent VM snapshot 202 is generated prior to the file system tree 220 because the VM snapshots of the VM 201 are scanned for malware from the most recent snapshot to the least recent snapshot). It should be understood that, in some examples, the first scan of a VM scans all of the files and generates reputations 212 for all of those scanned files. Any file that has been identified as being infected during a previous VM snapshot 202 scan must be rescanned to determine when the file became infected and/or to verify that the same file is not infected in previous snapshots. If a file has an infected reputation 212 in the previously generated file system tree 208 and is scanned and found to be clean in association with the current file system tree 220, it has been determined that the malware infection of that file occurred between the associated VM snapshot 204 and the VM snapshot 202 in time.

Unscanned files 224 are identified in the VM 216 and associated file system tree 220 by determining that a reputation 212 of a corresponding file in the previous file system tree 208 is not present. When a file has not been scanned in previous VM snapshot scan processes, it must be scanned in the current VM snapshot scan process by the malware detection agent 218 as described herein. In some examples, unscanned file 224 are files that were deleted or otherwise removed from the VM 201 between the time of the VM snapshot 204 and the VM snapshot 202.

Non-matching scanned files 226 are files that have been scanned previously and have a reputation 212 on the previous file system tree 208. In some examples, non-matching scanned files 226 have clean reputations 212 in the previous file system tree 208. However, the processing of such files includes comparing metadata of the file in the current file system tree 220 and corresponding file data 210 of the file in the previous file system tree 208 to determine whether the file changed during the period between VM snapshot 204 and VM snapshot 202. For instance, file attributes and/or file-to-disk cluster mappings of the file in both snapshots are compared and, if they differ, the file is in the subgroup of non-matching scanned files 226 and must be scanned by the malware detection agent 218.

Matching scanned files 228 are also files that have been scanned previously and have a reputation 212 on the previous file system tree 208. In some examples, the matching scanned files 228 have clean reputations 212 in the previous file system trec 208. Further, the metadata of the file in the current file system tree 220 and corresponding file data 210 of the file in the previous file system tree 208 match, indicating that the file has not changed between the VM snapshot 204 and the VM snapshot 202. Because the matching scanned files 228 have been found to be clean of malware in the previous VM snapshot 202 and they have not changed, the matching scanned files 228 are not scanned again by the malware detection agent 218 as described herein. In many examples, large amounts of files on VMs go unchanged between some snapshots, so refraining to scan the matching scanned file 228 and/or omitting the matching scanned files 228 from the group or set of files to be scanned by the malware detection agent 218 results in a significant reduction in time and computing resources used in scanning the files of the VM 216 for malware.

In some examples, the malware detection agent 218 performs malware scans 230 on previously detected, malware-infected files 222, unscanned files 224, and non-matching scanned files 226 on the VM 216 and based on the file data of the file system tree 220 and file system tree 208.

In some such examples, the performance of a malware scan 230 on a file includes determining that the file is part of the groups of files 222, 224, and/or 226 and/or that the file is not a matching scanned file 228, which is not scanned by the malware detection agent 218.

Further, in some examples, the performance of malware scans 230 includes reading the content of the file and computing a hash value associated with the file. The hash is then analyzed (e.g., sent to a cloud-based hash analysis system) to obtain an effective dynamic reputation indicator of the file (e.g., whether the file is malicious, malware-infected, clean or the like). Additionally, or alternatively, static analysis of the file using an antivirus (AV) engine is performed on the file. The total time required to perform such a malware scan 230 on a file is dependent on the storage I/O time to read the file, the CPU cost to compute the hash, the fetching of the reputation indicator from the cloud for a batch of files, and the time required to perform the AV scan. As a result of such malware scans 230, reputation indicators, or reputations 232, of scanned files are stored in the file system tree 220. These reputations 232 can be used to determine whether the current VM snapshot 204 is clean of malware (e.g., if all the reputations 232 indicate that the associated files are clean of malware) and/or the reputations 232 can be used during the scanning of the next VM snapshot 206 for malware in the same manner as reputations 212 of the file system tree 208 were used in the scanning of VM snapshot 204.

In some examples, the VM snapshot 204 is found to be clean of malware based on the performed malware scans 230 and reputations 212 from previous scans. In such examples, the system 200 enables data to be recovered from the VM snapshot 204 by another entity and/or the VM snapshot 204 is used to bring the VM 201 back online to perform its role from prior to the initiation of the malware scan described herein.

Alternatively, the VM snapshot 204 is found to be infected with malware and the next most recent VM snapshot 206 is then scanned for malware in the same manner as described herein for the VM snapshot 204. Such iterative snapshot scanning continues until a clean snapshot is identified.

It should be understood that, while many examples described herein use and/or are applied to VMs, in other examples, the systems and methods described herein are configured to operate using other types of virtual computing instances (VCIs), such as containers or the like. Furthermore, in some alternative examples, instead of VM snapshots, computing device image snapshots associated with a physical computing device are scanned for malware using the systems and/or methods described herein, such that the physical computing device can be rolled back to a previous snapshot state in response to the detection of malware thereon.

Further, in some examples, the metadata of files is stored in other types of data structures instead of or in addition to the file system trees 208 and 220. For instance, in some examples, the metadata of files is maintained in one or more logs during the scanning process and those log(s) can be accessed in place of the generation and use of the file system trees as described above.

Alternatively, or additionally, in some examples, the file system trees or other data structures are generated and maintained by another process, such that the illustrated elements of the system 200 do not need to generate and populate the file system trees. Instead, interfaces to the file system trees are made available to the entities of the system 200, such that the described scanning processes are performed by accessing metadata via those interfaces.

Figure 3:
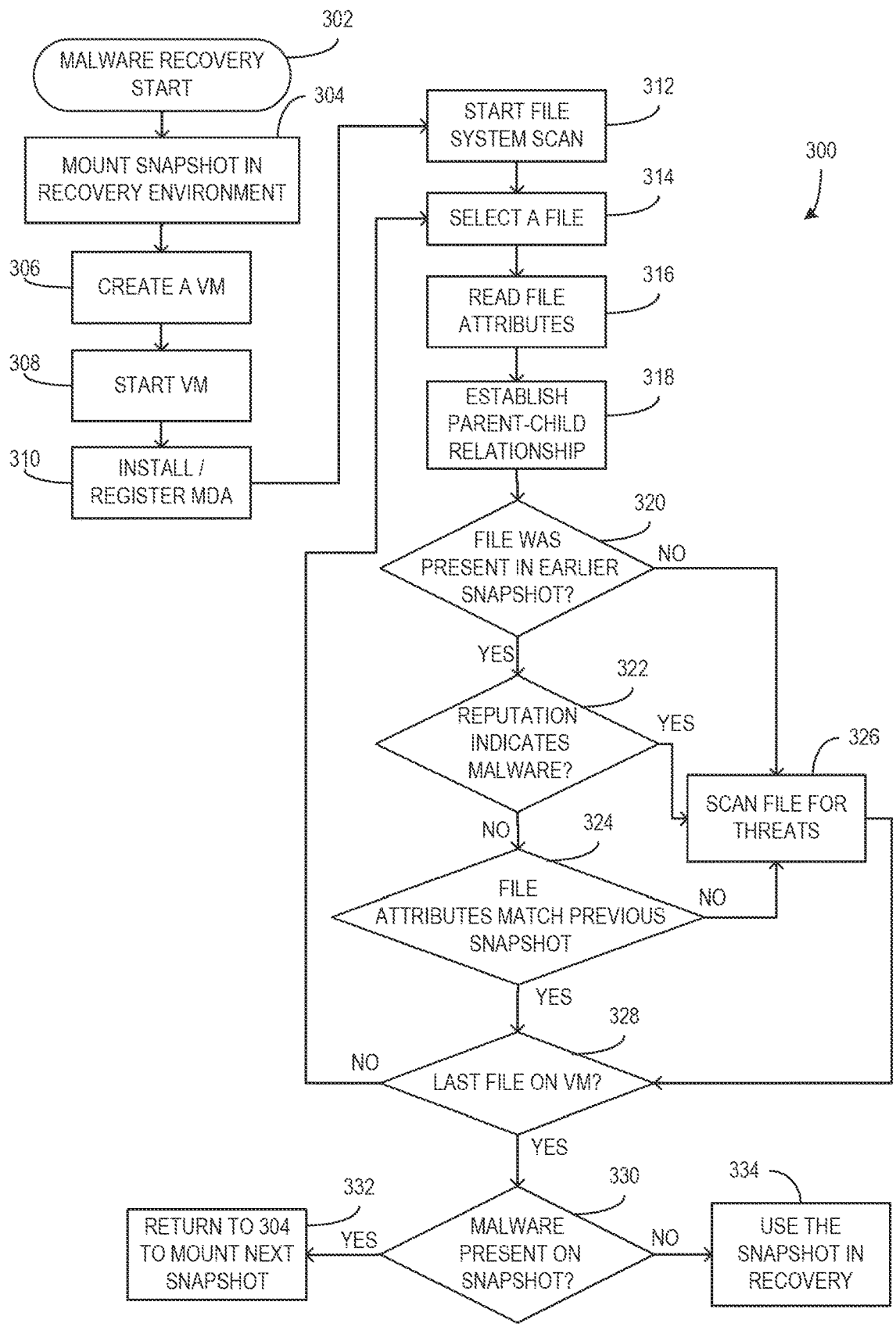
FIG. 3 is a flowchart illustrating an example method for scanning VM snapshots for malware.

FIG. 3 is a flowchart illustrating an example method 300 for scanning VM snapshots (e.g., VM snapshots 202-206) for malware. In some examples, the method 300 is executed or otherwise performed in a system such as systems 100 and/or 200 of FIGS. 1 and/or 2.

At 302, the malware recovery process starts and, at 304, a VM snapshot is mounted in a recovery environment. In some examples, the VM snapshot is the most recent snapshot of the associated VM. Further, in some examples, the method 300 iterates through multiple VM snapshots, such that the VM snapshot being mounted is the most recent VM snapshot created prior to the previously scanned VM snapshot (e.g., the VM snapshot 204 is scanned after the VM snapshot 202).

At 306, a VM (e.g., VM 216) is created from the mounted VM snapshot and started at 308. Once the VM is running, a malware detection agent (e.g., malware detection agent 218) is installed and/or registered on the running VM at 310.

At 312, a scan of the file system of the VM is started. At 314, a file of the file system of the VM is selected and, at 316, the file attributes of the selected file are read. Further, in some examples, reading the file attributes includes determining other metadata of the selected file, such as cluster mapping information associated with how the file is stored. At 318, a parent-child relationship is established for the selected file and associated file directories or other file system structures of which the selected file is a parent (e.g., higher on the file system hierarchy) or a child (e.g., lower on the file system hierarchy). For instance, in an example, the selected file is part of a directory that includes a group of files. Because the selected file is in the directory, the directory is the parent of the file, and the file is the child of the directory. The established parent-child relationship is stored as part of a file system tree or other similar file system metadata structure as described herein.

At 320, if the selected file was present in the earlier scanned snapshot, the process proceeds to 322. Alternatively, if the selected file was not present in the earlier scanned snapshot, the selected file is an unscanned file (e.g., an unscanned file 224) and the process proceeds to 326. In some examples, the presence of the selected file in the earlier scanned snapshot is determined by searching the file system tree (e.g., file system tree 208) associated with the previously scanned VM snapshot.

At 322, if the reputation of the selected file indicates that malware is present in the selected file, the process proceeds to 326. Alternatively, if the reputation of the selected file indicates that the file does not include malware, the process proceeds to 324. In some examples, the reputation of the selected file is obtained from the file system tree associated with the previously scanned VM snapshot.

At 324, if the file attributes of the selected file match the file attributes of the corresponding file in the previous file system tree, the process proceeds to 328. Alternatively, if the file attributes of the selected file do not match the file attributes of the corresponding file in the previous file system tree, the process proceeds to 326. In some examples, the file attributes are compared and, in addition, the cluster mappings and/or other metadata of the selected file and corresponding file in the previous file system tree. For example, the file attributes of the two files are first compared and, if they are found to match, the cluster mappings of the two files are then compared. If the file attributes of the two files differ, then the file has been changed between the snapshots and it is unnecessary to further compare the cluster mappings of the two files.

At 326, the selected file is scanned for threats by the installed malware detection agent. In some examples, the scan for threats is performed as described above with respect to malware scans 230 of FIG. 2. After the scan of the selected file is complete, the process proceeds to 328.

At 328, if the selected file is the last file in the VM, the process proceeds to 330. Alternatively, if the selected file is not the last file in the VM, the process returns to 314 to select a next file of the VM for processing.

It should be understood that, in examples where the first or most recent snapshot is being scanned for malware, all of the files are scanned for threats at 326 and the checks at 320, 322, and 324 are not necessarily performed. Thus, scanning the first snapshot of the VM generates a complete file system tree (e.g., file system tree 208) with reputations 212 for all files therein.

At 330, if malware is present on the snapshot based on the scans of the files of the VM at 326, the process proceeds to 332. Alternatively, if malware is not present on the snapshot, the process proceeds to 334. At 332, the process returns to 304 to mount the next VM snapshot of the VM being scanned (e.g., the next most recent VM snapshot).

At 334, the VM snapshot has been found to be clean of malware and it is used in recovery processes. For example, data is recovered from the clean snapshot as part of a recovery process. Additionally, or alternatively, the clean snapshot is used to create and run a VM in a system, enabling the system to continue operating despite the presence of malware on later versions of the VM.

Figure 4:
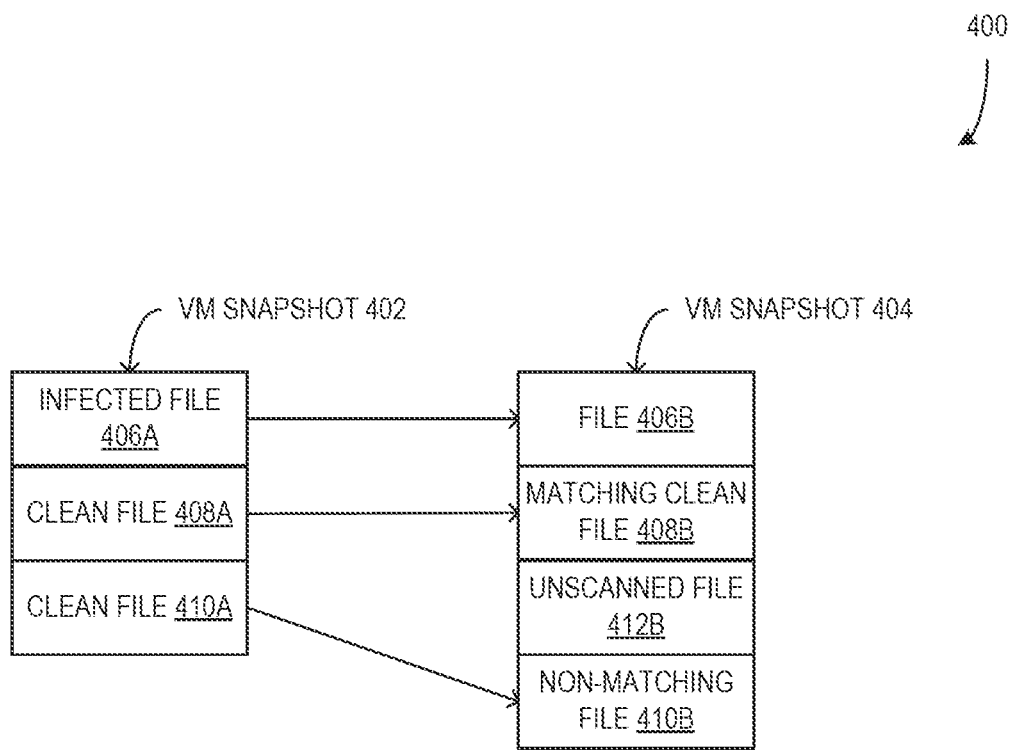
FIG. 4 is a block diagram illustrating an arrangement of files in two VM snapshots.

FIG. 4 is a block diagram illustrating an arrangement of files 400 in two VM snapshots 402 and 404. In some examples, the VM snapshots 402 and 404 are scanned, processed, or otherwise used as described herein with respect to the system 200 of FIG. 2.

As illustrated, each VM snapshot 402 and 404 have several files illustrated in columns, wherein the files' relative locations in the columns are representative of a cluster mapping or other relative location metadata of the files in the VM snapshots. Further, arrows between files in VM snapshot 402 and VM snapshot 404 represent that those files are corresponding files in the associated VM snapshots. For instance, the infected file 406A in VM snapshot 402 is considered the same file as the file 406B on VM snapshot 404, except that the infected file 406A and file 406B are different versions of the same file.

During a scan of the VM snapshot 404, the file 406B is scanned and, during the scan, it is determined that the version of the file in the VM snapshot 402 (the infected file 406A) is infected using the file system tree of the VM snapshot 402 (e.g., a file system tree 208). Thus, the file 406B is scanned for malware due to the corresponding file in the previous VM snapshot 402 being infected. In an example where the file 406B is found to be clean of malware, it has been determined that the file 406B was infected with malware at some point between the VM snapshot 404 and the VM snapshot 402.

During the scan of the VM snapshot 404, the file 408B is scanned and, during the scan, it is determined that the version of the file in the VM snapshot 402 (e.g., the clean file 408A) is clean of malware using the file system tree of the VM snapshot 402. The file 408B is compared to the clean file 408A using file attributes and/or cluster mapping data of file system trees associated with both VM snapshots. It is determined that the file 408B matches the clean file 408A and so, the matching clean file 408B is not scanned further for malware as described herein.

During the scan of the VM snapshot 404, the file 412B is scanned and, during the scan, it is determined that a corresponding file is not present in the VM snapshot 402. Thus, the unscanned file 412B is scanned for malware as described herein.

Finally, during the scan of the VM snapshot 404, the file 410B is scanned and, during the scan, it is determined that the version of the file in the VM snapshot 402 (e.g., the clean file 410A) is clean of malware using the file system tree of the VM snapshot 402. The file 410B is compared to the clean file 410A using file attributes and/or cluster mapping data of file system trees associated with both VM snapshots. It is determined that the file 410B does not match the clean file 410A (e.g., the cluster mapping data associated with the file non-matching file 410B differs due to its relative location with respect to the unscanned file 412B) and so, the non-matching clean file 410B is scanned for malware as described herein.

It should be understood that, in other examples, more, fewer, or different files are present in either or both VM snapshots 402 and 404 without departing from the description.

Figure 5:
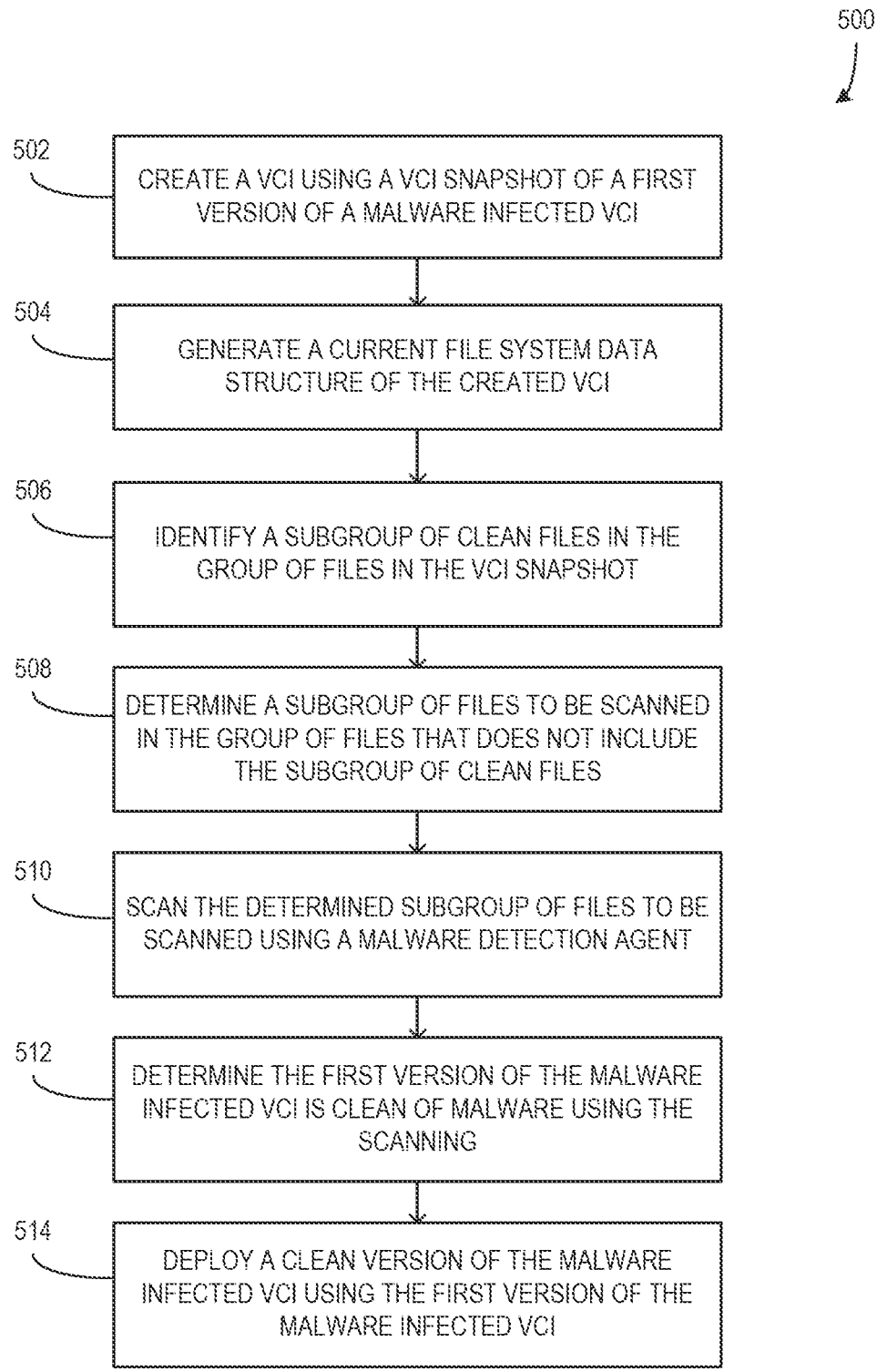
FIG. 5 is a flowchart illustrating an example method for scanning a subgroup of files in a VCI snapshot for malware.

FIG. 5 is a flowchart illustrating an example method 500 for scanning a subgroup of files (e.g., files 222, 224, and/or 226) in a VCI snapshot (e.g., VM snapshot 204) for malware. In some examples, the method 500 is executed or otherwise performed in a system such as systems 100 and/or 200 of FIGS. 1 and/or 2, respectively.

At 502, a VCI is created using a VCI snapshot of a first version of a malware infected VCI. In some examples, the VCI is a VM such as VM 216 and the VCI is created and deployed in an isolated recovery environment such as isolated recovery environment 214 and a malware detection agent, such as malware detection agent 218, is installed on the created VCI. Further, in some examples, the first version of the malware infected VCI is not the most recent version of the malware infected VCI and another, more recent version of the malware infected VCI has previously been scanned for malware and found to include at least one malware infected file. In some of such examples, the VCI snapshots of the malware infected VCI are scanned for malware starting with a VCI snapshot of the most recent version of the malware infected VCI and then scanning other VCI snapshots sequentially from the most recent versions to the least recent versions.

At 504, a current file system data structure of the created VCI is generated. In some examples, the current file system data structure is a file system tree such as file system tree 220, but in other examples, the other types of data structures are used without departing from the description. Further, in some of such examples, the file system data structure is populated with metadata of files in the created VCI and/or the associated VCI snapshot. Such metadata includes entity relationships such as parent-child relationships between files and directories; file attributes such as file size, date of last change of the file, or the like; and/or disk cluster mapping data of the file that describes how the data of the file is stored in the created VCI.

At 506, a subgroup of clean files (e.g., matching scanned files 228) in the group of files of the created VCI are identified. In some examples, identifying a clean file for the subgroup of clean files includes accessing a previous file system data structure (e.g., file system tree 208) associated with a previously scanned VCI snapshot (e.g., VM snapshot 202) associated with a second version of the malware infected VCI. In some of such examples, the second version is the immediately more recent version relative to the first version. The previous file system data structure is used to determine that a corresponding file is present in the previously scanned VCI snapshot, that the corresponding file has a clean reputation indicator (e.g., reputation 212), and that metadata of the corresponding file in the previous file system data structure matches the metadata of the current file in the current file system data structure (e.g., file attributes match and/or disk cluster mappings match).

Additionally, in some examples, the determination that metadata between the corresponding file and the current file match includes a two-stage comparison in which the file attributes are compared first and, if the file attributes match, the disk cluster mapping metadata is compared. Thus, if the file attributes do not match, the disk cluster mapping comparison is avoided.

At 508, a subgroup of files to be scanned is determined, wherein the subgroup of files to be scanned does not include the subgroup of clean files. Because the files in the subgroup of clean files have already been determined to be clean of malware, the relatively costly malware scanning of those files can be avoided. Files that are not included in the subgroup of clean files are included in the subgroup of files to be scanned.

In some examples, the determination of the subgroup of files to be scanned includes determining that some files are files that have been previously determined to include malware (e.g., previously detected malware-infected files 222), determining that some files are files that have not been previously scanned (e.g., unscanned file 224), and/or determining that some files are files that have previously been scanned and found to be clean of malware but have differing metadata from the previously scanned version of the file (e.g., non-matching scanned files 226). For the first type of file to be scanned, the previous file system data structure is used to determine that a corresponding file in the previously scanned VCI snapshot was found to be infected with malware. For the second type of file to be scanned, the previous file system data structure is used to determine that a corresponding file is not present in the previously scanned VCI snapshot. And for the third type of file to be scanned, the previous file system data structure is used to determine that the corresponding file in the previously scanned VCI snapshot was found to be clean and to determine that the metadata of the corresponding file differs from the metadata of the current file.

At 510, the determined subgroup of files to be scanned are scanned using a malware detection agent (e.g., malware detection agent 218). In some examples, the results of the scanning of the subgroup of files are then recorded in the current file system data structure as reputation indicators of the files scanned. For instance, a file that is scanned and found to be infected with malware is associated with an infected reputation indicator in the current file system data structure while a file that is scanned and found to be clean of malware is associated with a clean reputation indicator in the current file system data structure. These reputation indicators are used during a later iteration of the method 500 in scanning the next VCI snapshot for malware as described herein in an example where the VCI snapshot is found to be infected with malware.

At 512, the first version of the malware infected VCI is determined to be clean of malware based on the scanning of the subgroup of files to be scanned and the identification of the subgroup of clean files. In some examples, the determination that the first version of the VCI is clean of malware indicates that all files in the VCI snapshot of the first version of the malware infected VCI are clean of malware.

At 514, a clean version of the malware infected VCI is deployed using the first version of the malware infected VCI. It should be understood that the malware infected VCI is infected with malware in at least the most recent version thereof and that the first version that has been found to be clean of malware is at least the previous version of that VCI, if not an even less recent version of the VCI. So, a less recent version of the VCI for which the described recovery operations are being performed is deployed as a VCI in the associated system. This deployed VCI is clean of malware and can be used to maintain effective operations of the system. Further, in other examples, data from the first version of the malware infected VCI is accessed for use during the recovery operations associated with the malware infected VCI.

Exemplary Operating Environment

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, scanning files in VCI snapshots for malware as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a malware detector instantiating a virtual computing instance (VCI) using a VCI snapshot of a version of a malware infected VCI; the malware detector generating a current file system data structure of the instantiated VCI, wherein the generated current file system data structure includes data associated with a group of files in the VCI snapshot of the version of the malware infected VCI; a clean file identifier of the malware detector identifying a subgroup of clean files in the group of files using a previous file system data structure associated with a previously scanned VCI snapshot of another version of the malware infected VCI, wherein files in the subgroup of clean files have data in the current file system data structure that matches corresponding data in the previous file system data structure and have clean reputation indicators in the previous file system data structure; a malware scanner of the malware detector determining a subgroup of files to be scanned in the group of files, wherein the subgroup of files to be scanned omits the identified subgroup of clean files; the malware scanner scanning the determined subgroup of files for malware using a malware detection agent; the malware detector determining that the version of the malware infected VCI is clean of malware using the scanning; and based on determining that the version of the malware infected VCI is clean of malware, the malware detector deploying a clean version of the malware infected VCI using the version of the malware infected VCI.

An example computerized method comprises: obtaining a virtual computing instance (VCI) snapshot associated with a version of a malware infected VCI; and scanning the obtained VCI snapshot for malware, wherein the scanning includes: selecting a first file of the obtained VCI snapshot; determining that a corresponding file to the selected first file in a previously scanned VCI snapshot associated with another version of the malware infected VCI has a clean reputation indicator in a previous file system data structure of the previously scanned VCI snapshot; determining that metadata of the selected first file matches metadata of the corresponding file in the previous file system data structure of the previously scanned VCI snapshot; and refraining from scanning the selected first file for malware using a malware detection agent.

One or more computer storage media have computer-executable instructions that, upon execution by a processor, cause the processor to at least: obtain a virtual computing instance (VCI) snapshot associated with a version of a malware infected VCI; and scan the obtained VCI snapshot for malware, wherein the scanning includes: selecting a first file of the obtained VCI snapshot; determining that a corresponding file to the selected first file in a previously scanned VCI snapshot associated with another version of the malware infected VCI has a clean reputation indicator in a previous file system data structure of the previously scanned VCI snapshot; determining that metadata of the selected first file matches metadata of the corresponding file in the previous file system data structure of the previously scanned VCI snapshot; and refraining from scanning the selected first file for malware using a malware detection agent.

Alternatively, or in addition to the other examples described herein, examples include any combination of the following:

- wherein creating the VCI using the VCI snapshot of the version of the malware infected VCI includes: deploying the created VCI in an isolated recovery environment; and installing the malware detection agent on the created VCI.
- wherein determining the subgroup of files to be scanned in the group of files includes: identifying a file in the group of files that corresponds to a malware infected file in the previously scanned VCI snapshot using a reputation indicator of the malware infected file in the previous file system data structure; and including the identified file in the subgroup of files to be scanned.
- wherein determining the subgroup of files to be scanned in the group of files includes: identifying a file in the group of files for which a corresponding file is not present in the previously scanned VCI snapshot using the previous file system data structure; and including the identified file in the subgroup of files to be scanned.
- wherein determining the subgroup of files to be scanned in the group of files includes: identifying a file in the group of files that corresponds to a file with a clean reputation indicator in the previous file system data structure and for which data in the current file system data structure differs from corresponding data in the previous file system data structure; and including the identified file in the subgroup of files to be scanned.
- wherein identifying the subgroup of clean files in the group of files further includes: comparing file attributes associated with a selected file of the group of files in the current file system data structure to file attributes associated with a corresponding file in the previous file system data structure; based on the compared file attributes matching, compare a disk cluster mapping of the selected file in the current file system data structure to a corresponding disk cluster mapping of the corresponding file in the previous file system data structure; and based on the compared disk cluster mappings matching and a reputation indicator in the previous file system data structure indicating the corresponding file to the selected file is clean, including the selected file in the subgroup of clean files.
- wherein the memory and the computer program code are configured to further cause the processor to: recover data from the version of the malware infected VCI based on the determination that the version of the malware infected VCI is clean of malware.
- wherein scanning the obtained VCI snapshot for malware further includes: selecting a second file of the obtained VCI snapshot; determining that a corresponding file to the selected second file in the previously scanned VCI snapshot associated with the other version of the malware infected VCI has an infected reputation indicator in the previous file system data structure of the previously scanned VCI snapshot; and scanning the selected second file for malware using the malware detection agent.
- wherein scanning the obtained VCI snapshot for malware further includes: selecting a second file of the obtained VCI snapshot; determining that a corresponding file to the selected second file is not present in the previously scanned VCI snapshot associated with the other version of the malware infected VCI; and scanning the selected second file for malware using the malware detection agent.
- wherein scanning the obtained VCI snapshot for malware further includes: selecting a second file of the obtained VCI snapshot; determining that a corresponding file to the selected second file in the previously scanned VCI snapshot associated with the other version of the malware infected VCI has a clean reputation indicator in the previous file system data structure of the previously scanned VCI snapshot; determining that metadata of the selected second file differs from metadata of the corresponding file in the previous file system data structure of the previously scanned VCI snapshot; and scanning the selected second file for malware using the malware detection agent.
- further comprising: determining the version of the malware infected VCI is clean of malware based on scanning the obtained VCI snapshot for malware; and performing a recovery operation using the obtained VCI snapshot, wherein the recovery operation includes at least one of the following: accessing data stored in the obtained VCI snapshot for use in the recovery operation; and deploying a clean version of the malware infected VCI using the obtained VCI snapshot.
- further comprising: determining the version of the malware infected VCI is infected with malware based on scanning the obtained VCI snapshot for malware; obtaining another VCI snapshot associated with a third version of the malware infected VCI, wherein the other version of the malware infected VCI is a later version than the version of the malware infected VCI and the version of the malware infected VCI is a later version than the third version of the malware infected VCI; and scanning the obtained VCI snapshot associated with the third version of the malware infected VCI for malware.

Another example system comprises: a processor; and a memory comprising computer program code, the memory and the computer program code configured to cause the processor to: configure a computing device using a snapshot of a version of a malware infected computing device; generate a current file system data structure of the configured computing device, wherein the generated file system data structure includes data associated with a group of files in the snapshot of the version of the malware infected computing device; identify a subgroup of clean files in the group of files using a previous file system data structure associated with a previously scanned snapshot of another version of the malware infected computing device, wherein files in the subgroup of clean files have data in the current file system data structure that matches corresponding data in the previous file system data structure and have clean reputation indicators in the previous file system data structure; determine a subgroup of files to be scanned in the group of files, wherein the subgroup of files to be scanned omits the identified subgroup of clean files; scan the determined subgroup of files to be scanned for malware using a malware detection agent; determine the version of the malware infected computing device is clean of malware using the scanning; and based on determining that the version of the malware infected computing device is clean of malware, deploy a clean version of the malware infected computing device using the version of the malware infected computing device.

An example computerized method comprises: obtaining a snapshot associated with a version of a malware infected computing device; and scanning the obtained snapshot for malware, wherein the scanning includes: selecting a first file of the obtained snapshot; determining that a corresponding file to the selected first file in a previously scanned snapshot associated with another version of the malware infected computing device has a clean reputation indicator in a previous file system data structure of the previously scanned snapshot; determining that metadata of the selected first file matches metadata of the corresponding file in the previous file system data structure of the previously scanned snapshot; and refraining from scanning the selected first file for malware using a malware detection agent.

One or more computer storage media have computer-executable instructions that, upon execution by a processor, cause the processor to at least: obtain a snapshot associated with a version of a malware infected computing device; and scan the obtained snapshot for malware, wherein the scanning includes: selecting a first file of the obtained snapshot; determining that a corresponding file to the selected first file in a previously scanned snapshot associated with another version of the malware infected computing device has a clean reputation indicator in a previous file system data structure of the previously scanned snapshot; determining that metadata of the selected first file matches metadata of the corresponding file in the previous file system data structure of the previously scanned snapshot; and refraining from scanning the selected first file for malware using a malware detection agent.

Alternatively, or in addition to the other examples described herein, examples include any combination of the following:
- wherein configuring the computing device using the snapshot of the version of the malware infected computing device includes: configuring the computing device with an isolated recovery environment; and installing the malware detection agent on the configured computing device.
- wherein determining the subgroup of files to be scanned in the group of files includes: identifying a file in the group of files that corresponds to a malware infected file in the previously scanned snapshot using a reputation indicator of the malware infected file in the previous file system data structure; and including the identified file in the subgroup of files to be scanned.
- wherein determining the subgroup of files to be scanned in the group of files includes: identifying a file in the group of files for which a corresponding file is not present in the previously scanned snapshot using the previous file system data structure; and including the identified file in the subgroup of files to be scanned.
- wherein determining the subgroup of files to be scanned in the group of files includes: identifying a file in the group of files that corresponds to a file with a clean reputation indicator in the previous file system data structure and for which data in the current file system data structure differs from corresponding data in the previous file system data structure; and including the identified file in the subgroup of files to be scanned.
- wherein identifying the subgroup of clean files in the group of files further includes: comparing file attributes associated with a selected file of the group of files in the current file system data structure to corresponding file attributes in the previous file system data structure; based on the compared file attributes matching, compare a disk cluster mapping of the selected file in the current file system data structure to a corresponding disk cluster mapping in the previous file system data structure; and based on the compared disk cluster mappings matching and a reputation indicator in the previous file system data structure indicating a corresponding file to the selected file is clean, including the selected file in the subgroup of clean files.
- wherein the memory and the computer program code are configured to further cause the processor to: recover data from the version of the malware infected computing device based on the determination that the version of the malware infected computing device is clean of malware.
- wherein scanning the obtained snapshot for malware further includes: selecting a second file of the obtained snapshot; determining that a corresponding file to the selected second file in the previously scanned snapshot associated with the other version of the malware infected computing device has an infected reputation indicator in the previous file system data structure of the previously scanned snapshot; and scanning the selected second file for malware using the malware detection agent.
- wherein scanning the obtained snapshot for malware further includes: selecting a second file of the obtained snapshot; determining that a corresponding file to the selected second file is not present in the previously scanned snapshot associated with the other version of the malware infected computing device; and scanning the selected second file for malware using the malware detection agent.
- wherein scanning the obtained snapshot for malware further includes: selecting a second file of the obtained snapshot; determining that a corresponding file to the selected second file in the previously scanned snapshot associated with the other version of the malware infected computing device has a clean reputation indicator in the previous file system data structure of the previously scanned snapshot; determining that metadata of the selected second file differs from metadata of the corresponding file in the previous file system data structure of the previously scanned snapshot; and scanning the selected second file for malware using the malware detection agent.
- further comprising: determining the version of the malware infected computing device is clean of malware based on scanning the obtained snapshot for malware; and performing a recovery operation using the obtained snapshot, wherein the recovery operation includes at least one of the following: accessing data stored in the obtained snapshot for use in the recovery operation; and deploying a clean version of the malware infected computing device using the obtained snapshot.
- further comprising: determining the version of the malware infected computing device is infected with malware based on scanning the obtained snapshot for malware; obtaining another snapshot associated with a third version of the malware infected computing device, wherein the other version of the malware infected computing device is a later version than the version of the malware infected computing device and the version of the malware infected computing device is a later version than the third version of the malware infected computing device; and scanning the obtained snapshot associated with the third version of the malware infected computing device for malware.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a virtual computing instance (VCI) snapshot associated with a version of a malware infected VCI; and exemplary means for scanning the obtained VCI snapshot for malware, wherein the scanning includes: exemplary means for selecting a first file of the obtained VCI snapshot; exemplary means for determining that a corresponding file to the selected first file in a previously scanned VCI snapshot associated with another version of the malware infected VCI has a clean reputation indicator in a previous file system data structure of the previously scanned VCI snapshot; exemplary means for determining that metadata of the selected first file matches metadata of the corresponding file in the previous file system data structure of the previously scanned VCI snapshot; and exemplary means for refraining from scanning the selected first file for malware using a malware detection agent.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   one or more processors; and
   one or more non-transitory computer readable media executable by the one or more processors to perform operations comprising:
   instantiating a virtual computing instance (VCI) using a VCI snapshot of a version of a malware infected VCI;
   generate generating a current file system data structure of the instantiated VCI, wherein the generated current file system data structure includes data associated with a group of files in the VCI snapshot of the version of the malware infected VCI;
   identifying a subgroup of clean files in the group of files using a previous file system data structure associated with a previously scanned VCI snapshot of another version of the malware infected VCI, wherein files in the subgroup of clean files have data in the current file system data structure that matches corresponding data in the previous file system data structure and have clean reputation indicators in the previous file system data structure;
   determining a subgroup of files to be scanned in the group of files, wherein the subgroup of files to be scanned omits the identified subgroup of clean files;
   scanning the determined subgroup of files for malware using a malware detection agent;
   determining that the version of the malware infected VCI is clean of malware using the scanning; and
   deploying, based on determining that the version of the malware infected VCI is clean of malware, a clean version of the malware infected VCI using the version of the malware infected VCI.

2. The system of claim 1, wherein instantiating the VCI using the VCI snapshot of the version of the malware infected VCI includes:
   deploying the instantiated VCI in an isolated recovery environment; and
   installing the malware detection agent on the instantiated VCI.

3. The system of claim 1, wherein determining the subgroup of files to be scanned in the group of files includes:
   identifying a file in the group of files that corresponds to a malware infected file in the previously scanned VCI snapshot using a reputation indicator of the malware infected file in the previous file system data structure; and including the identified file in the subgroup of files to be scanned.

4. The system of claim 1, wherein determining the subgroup of files to be scanned in the group of files includes:

identifying a file in the group of files for which a corresponding file is not present in the previously scanned VCI snapshot using the previous file system data structure; and including the identified file in the subgroup of files to be scanned.

5. The system of claim 1, wherein determining the subgroup of files to be scanned in the group of files includes:

identifying a file in the group of files that corresponds to a file with a clean reputation indicator in the previous file system data structure and for which data in the current file system data structure differs from corresponding data in the previous file system data structure; and including the identified file in the subgroup of files to be scanned.

6. The system of claim 1, wherein identifying the subgroup of clean files in the group of files further includes:

comparing file attributes associated with a selected file of the group of files in the current file system data structure to file attributes associated with a corresponding file in the previous file system data structure;

based on the compared file attributes matching, compare a disk cluster mapping of the selected file in the current file system data structure to a corresponding disk cluster mapping of the corresponding file in the previous file system data structure; and based on the compared disk cluster mappings matching and a reputation indicator in the previous file system data structure indicating the corresponding file to the selected file is clean, including the selected file in the subgroup of clean files.

7. The system of claim 1 the operations further comprising:

recovering data from the version of the malware infected VCI based on the determination that the version of the malware infected VCI is clean of malware.

8. An apparatus comprising:

one or more non-transitory computer readable media executable by one or more processors to perform operations comprising:

instantiating a virtual computing instance (VCI) using a VCI snapshot of a version of a malware infected VCI;

generating a current file apparatus data structure of the instantiated VCI, wherein the generated current file apparatus data structure includes data associated with a group of files in the VCI snapshot of the version of the malware infected VCI;

identifying a subgroup of clean files in the group of files using a previous file apparatus data structure associated with a previously scanned VCI snapshot of another version of the malware infected VCI, wherein files in the subgroup of clean files have data in the current file apparatus data structure that matches corresponding data in the previous file apparatus data structure and have clean reputation indicators in the previous file apparatus data structure;

determining a subgroup of files to be scanned in the group of files, wherein the subgroup of files to be scanned omits the identified subgroup of clean files;

scanning the determined subgroup of files for malware using a malware detection agent;

determining that the version of the malware infected VCI is clean of malware using the scanning; and deploying, based on determining that the version of the malware infected VCI is clean of malware, a clean version of the malware infected VCI using the version of the malware infected VCI.

9. The apparatus of claim 8, wherein instantiating the VCI using the VCI snapshot of the version of the malware infected VCI includes:

deploying the instantiated VCI in an isolated recovery environment; and installing the malware detection agent on the instantiated VCI.

10. The apparatus of claim 8, wherein determining the subgroup of files to be scanned in the group of files includes:

identifying a file in the group of files that corresponds to a malware infected file in the previously scanned VCI snapshot using a reputation indicator of the malware infected file in the previous file apparatus data structure; and including the identified file in the subgroup of files to be scanned.

11. The apparatus of claim 8, wherein determining the subgroup of files to be scanned in the group of files includes:

identifying a file in the group of files for which a corresponding file is not present in the previously scanned VCI snapshot using the previous file apparatus data structure; and including the identified file in the subgroup of files to be scanned.

12. The apparatus of claim 8, wherein determining the subgroup of files to be scanned in the group of files includes:

identifying a file in the group of files that corresponds to a file with a clean reputation indicator in the previous file apparatus data structure and for which data in the current file apparatus data structure differs from corresponding data in the previous file apparatus data structure; and including the identified file in the subgroup of files to be scanned.

13. The apparatus of claim 8, wherein identifying the subgroup of clean files in the group of files further includes:

comparing file attributes associated with a selected file of the group of files in the current file apparatus data structure to file attributes associated with a corresponding file in the previous file apparatus data structure;

based on the compared file attributes matching, compare a disk cluster mapping of the selected file in the current file apparatus data structure to a corresponding disk cluster mapping of the corresponding file in the previous file apparatus data structure; and based on the compared disk cluster mappings matching and a reputation indicator in the previous file apparatus data structure indicating the corresponding file to the selected file is clean, including the selected file in the subgroup of clean files.

14. The apparatus of claim 8, the operations further comprising:

recovering data from the version of the malware infected VCI based on the determination that the version of the malware infected VCI is clean of malware.

15. A method comprising:

instantiating a virtual computing instance (VCI) using a VCI snapshot of a version of a malware infected VCI;

a malware detector being further configured to generate a current file system data structure of the instantiated VCI, wherein the generated current file system data structure includes data associated with a group of files in the VCI snapshot of the version of the malware infected VCI;

identifying a subgroup of clean files in the group of files using a previous file system data structure associated with a previously scanned VCI snapshot of another version of the malware infected VCI, wherein files in the subgroup of clean files have data in the current file system data structure that matches corresponding data in the previous file system data structure and have clean reputation indicators in the previous file system data structure;

a malware scanner of the malware detector configured to determine a subgroup of files to be scanned in the group of files, wherein the subgroup of files to be scanned omits the identified subgroup of clean files;

scanning the determined subgroup of files for malware using a malware detection agent;

determining that the version of the malware infected VCI is clean of malware using the scanning; and deploying, based on determining that the version of the malware infected VCI is clean of malware, a clean version of the malware infected VCI using the version of the malware infected VCI.

16. The method of claim 15, wherein instantiating the VCI using the VCI snapshot of the version of the malware infected VCI includes:
   deploying the instantiated VCI in an isolated recovery environment; and
   installing the malware detection agent on the instantiated VCI.

17. The method of claim 15, wherein determining the subgroup of files to be scanned in the group of files includes:
   identifying a file in the group of files that corresponds to a malware infected file in the previously scanned VCI snapshot using a reputation indicator of the malware infected file in the previous file system data structure; and
   including the identified file in the subgroup of files to be scanned.

18. The method of claim 15, wherein determining the subgroup of files to be scanned in the group of files includes:
   identifying a file in the group of files for which a corresponding file is not present in the previously scanned VCI snapshot using the previous file system data structure; and
   including the identified file in the subgroup of files to be scanned.

19. The method of claim 15, wherein determining the subgroup of files to be scanned in the group of files includes:
   identifying a file in the group of files that corresponds to a file with a clean reputation indicator in the previous file system data structure and for which data in the current file system data structure differs from corresponding data in the previous file system data structure; and
   including the identified file in the subgroup of files to be scanned.

20. The method of claim 15, wherein identifying the subgroup of clean files in the group of files further includes:
   comparing file attributes associated with a selected file of the group of files in the current file system data structure to file attributes associated with a corresponding file in the previous file system data structure;
   based on the compared file attributes matching, compare a disk cluster mapping of the selected file in the current file system data structure to a corresponding disk cluster mapping of the corresponding file in the previous file system data structure; and
   based on the compared disk cluster mappings matching and a reputation indicator in the previous file system data structure indicating the corresponding file to the selected file is clean, including the selected file in the subgroup of clean files.

* * * * *